US010111484B2

(12) United States Patent
Ye et al.

(10) Patent No.: US 10,111,484 B2
(45) Date of Patent: Oct. 30, 2018

(54) HELMET WITH HIDDEN LIGHT SOURCE AND METHOD FOR MANUFACTURING SAME

(71) Applicant: Shenzhen Qianhai LIVALL IoT Technology Co., Ltd., Shenzhen, Guangdong Province (CN)

(72) Inventors: Yong-Zheng Ye, Shenzhen (CN); Bo Zheng, Shenzhen (CN); Zhi-Ming Li, Nanchong (CN)

(73) Assignee: SHENZHEN QIANHAI LIVALL IOT TECHNOLOGY CO., LTD., Shenzhen, Guangdong Province (CN)

( * ) Notice: Subject to any disclaimer, the term of this patent is extended or adjusted under 35 U.S.C. 154(b) by 80 days.

(21) Appl. No.: 15/429,159

(22) Filed: Feb. 10, 2017

(65) Prior Publication Data

US 2018/0177258 A1 Jun. 28, 2018

(30) Foreign Application Priority Data

Dec. 28, 2016 (CN) .......................... 2016 1 1234117

(51) Int. Cl.

| | |
|---|---|
| ***A42B 3/04*** | (2006.01) |
| ***G02B 5/00*** | (2006.01) |
| ***F21V 15/01*** | (2006.01) |
| ***F21V 3/04*** | (2018.01) |
| ***A42C 2/00*** | (2006.01) |
| *F21Y 115/10* | (2016.01) |
| *F21Y 115/15* | (2016.01) |
| *F21Y 103/10* | (2016.01) |
| *F21W 121/00* | (2006.01) |

(52) U.S. Cl.

CPC ................ *A42B 3/044* (2013.01); *A42C 2/00* (2013.01); *F21V 3/049* (2013.01); *F21V 15/01* (2013.01); *G02B 5/003* (2013.01); *F21W 2121/00* (2013.01); *F21Y 2103/10* (2016.08); *F21Y 2115/10* (2016.08); *F21Y 2115/15* (2016.08)

(58) Field of Classification Search

CPC ........... A42B 3/044; A42C 2/00; F21V 3/049; F21V 15/01; G02B 5/003

USPC .......................................................... 362/106

See application file for complete search history.

(56) References Cited

U.S. PATENT DOCUMENTS

| | | | | |
|---|---|---|---|---|
| 2,052,933 A * | 9/1936 | Louft | B41N 1/243 | 428/136 |
| 5,426,792 A * | 6/1995 | Murasko | A42B 3/044 | 2/422 |
| 5,479,325 A * | 12/1995 | Chien | A42B 1/248 | 2/422 |
| 6,880,948 B2 * | 4/2005 | Koch | G02B 5/003 | 362/600 |

(Continued)

*Primary Examiner* — Bryon T Gyllstrom

(74) *Attorney, Agent, or Firm* — Cheng-Ju Chiang

(57) ABSTRACT

A method for manufacturing a helmet with hidden light source includes: providing a transparent base film and a screen printing plate, wherein the base film comprises a first portion and a second portion, and the screen printing plate covers and corresponds to the first portion; printing a lightproof ink layer on the second portion and the screen printing plate; removing the screen printing plate; coating a light transmitting ink layer on the lightproof ink layer; attaching at least one light source on the light transmitting ink layer corresponding to the first portion; and forming a helmet base to cover the at least one light source.

10 Claims, 7 Drawing Sheets

(56) References Cited

U.S. PATENT DOCUMENTS

| | | | | |
|---|---|---|---|---|
| 7,494,246 | B2 * | 2/2009 | Harbers | F21S 8/04 362/223 |
| 7,726,828 | B2 * | 6/2010 | Sato | G02B 6/0043 362/341 |
| 7,817,361 | B2 * | 10/2010 | Mimura | G02B 5/003 359/613 |
| 7,914,195 | B2 * | 3/2011 | Sawada | G02B 6/0076 362/612 |
| 7,937,865 | B2 * | 5/2011 | Li | G09F 13/20 362/293 |
| 8,421,323 | B2 * | 4/2013 | Park | H01J 11/44 313/112 |
| 2008/0253137 | A1 * | 10/2008 | Muller | F21V 21/06 362/382 |
| 2009/0086468 | A1 * | 4/2009 | Carillo | A42B 3/044 362/106 |
| 2010/0265731 | A1 * | 10/2010 | Van Herpen | B60Q 1/52 362/543 |

* cited by examiner

HELMET WITH HIDDEN LIGHT SOURCE AND METHOD FOR MANUFACTURING SAME

PRIORITY

This application claims priority of a China patent application serial No. 201611234117.1, titled "HELMET HOUSING, HELMET WITH HIDDEN LIGHT SOURCE AND METHOD FOR MANUFACTURING SAME" and filed on Dec. 28, 2016, the contents of which are incorporated by reference herein in their entirety for all intended purposes.

TECHNICAL FIELD

The present disclosure relates to a helmet, and more particularly, to a helmet with a hidden light source and a method for manufacturing the helmet.

BACKGROUND

Cycling, as a way of travel and sports, becomes more and more popular. And helmet becomes a standard configuration for a cycling hobbyist. In order to satisfy needs of different cycling hobbyists, the helmet is various. A kind of luminous helmet can emit light for both decoration and warning. In prior, aluminous helmet includes a light source, which is set on a surface of the luminous helmet or arranged in a groove defined from the surface into the luminous helmet. There are a variety of disadvantages of such luminous helmet, for example the luminous helmet may have a bad appearance because of the exposed light source and the exposed light source may be easily damaged as a result of external impact. In order to avoid these disadvantages, a helmet with hidden light source is desired.

BRIEF DESCRIPTION OF THE DRAWINGS

To illustrate the technical solution according to embodiments of the present disclosure more clearly, drawings to be used in the description of the embodiments are described in brief as follows. Obviously, the drawings in the following description are merely some embodiments of the present disclosure. It is to be noted that for those ordinarily skilled in the art, other drawings can be fetched according to these drawings without doing any creative work.

PREFERRED EMBODIMENTS

The technical solution in the embodiments of the present disclosure will be described clearly and completely accompanying with drawings of embodiments of the present disclosure as follows. Apparently, the described embodiments are only a part of the embodiments of the present disclosure, but not all the embodiments. Based on the embodiments of the present disclosure, all other embodiments achieved by those ordinarily skilled in the art without doing any creative work, should be included in the scope of the present disclosure.

Figure 1:
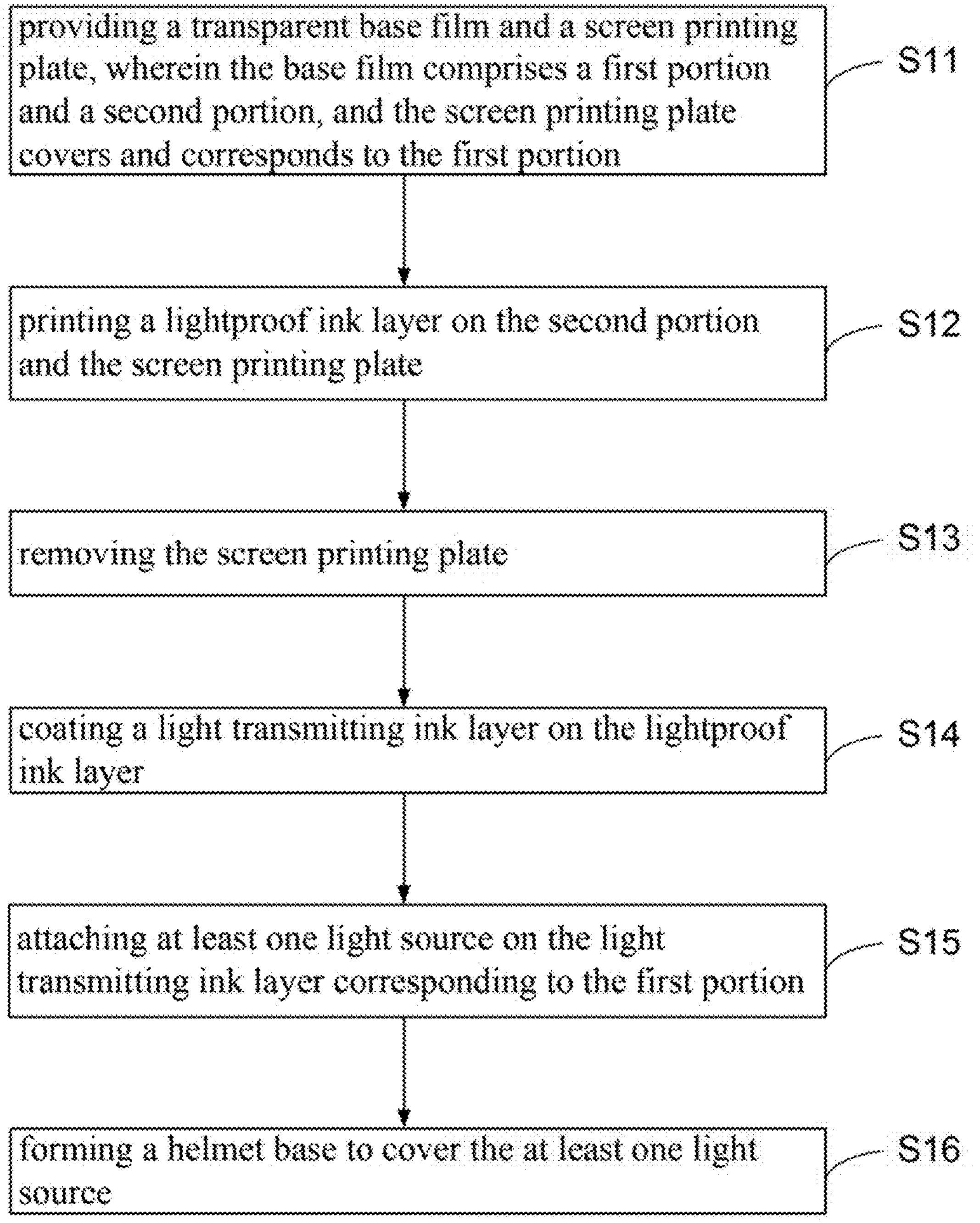
FIG. 1 is a flow chart of a method for manufacturing a helmet with a hidden light source, according to a first embodiment of the present invention.

Referring to FIG. 1, a method for manufacturing a helmet with a hidden light source according to a first embodiment of the present disclosure includes step S11 to step S16.

Figure 2:
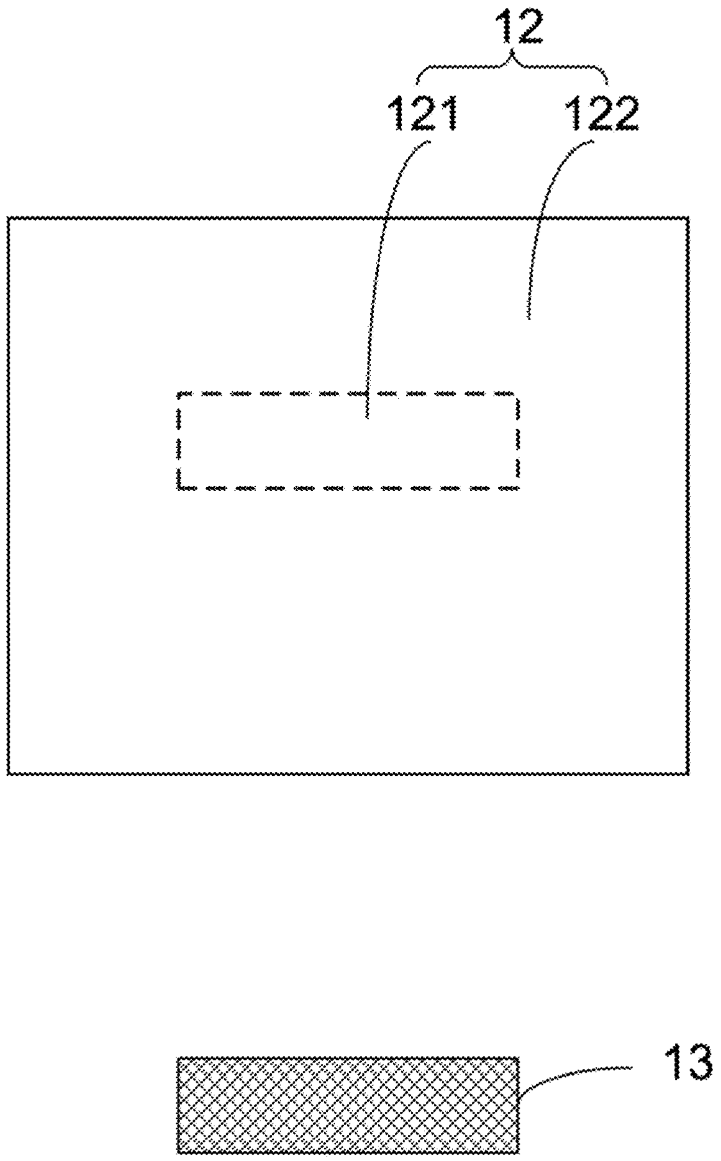
FIG. 2 is a schematic vertical view of a base film and a screen printing plate, according to the first embodiment of the present invention.
Figure 3:
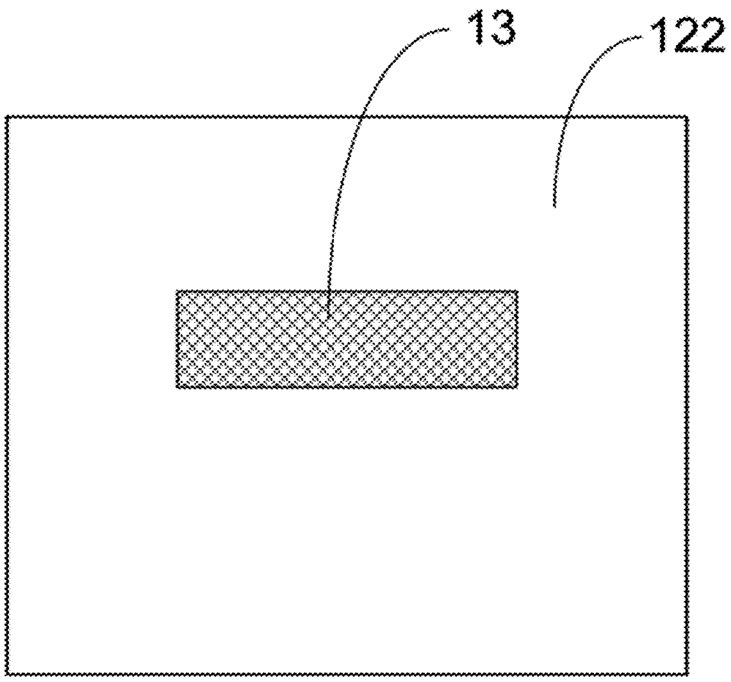
FIG. 3 is a schematic vertical view of the screen printing plate covering a first portion of the base film of FIG. 2.

Referring to FIG. 2, in step S11, a transparent base film 12 and a screen printing plate 13 are provided, and the screen printing plate 13 is arranged above the base film 12. The base film 12 comprises a first portion 121 and a second portion 122 surrounding the first portion 121. In the present embodiment, the first portion 121 is rectangular. Person having ordinary skill in the art understands that the shape of the first portion 121 is not limited, also can be other suitable shape. The screen printing plate 13, having a plurality of meshes, covers and corresponds to the first portion 121, as shown in FIG. 3. The material of the base film 12 can be Polycarbonate (PC), Polyethylene terephthalate (PET), or other suitable material.

Figure 4:
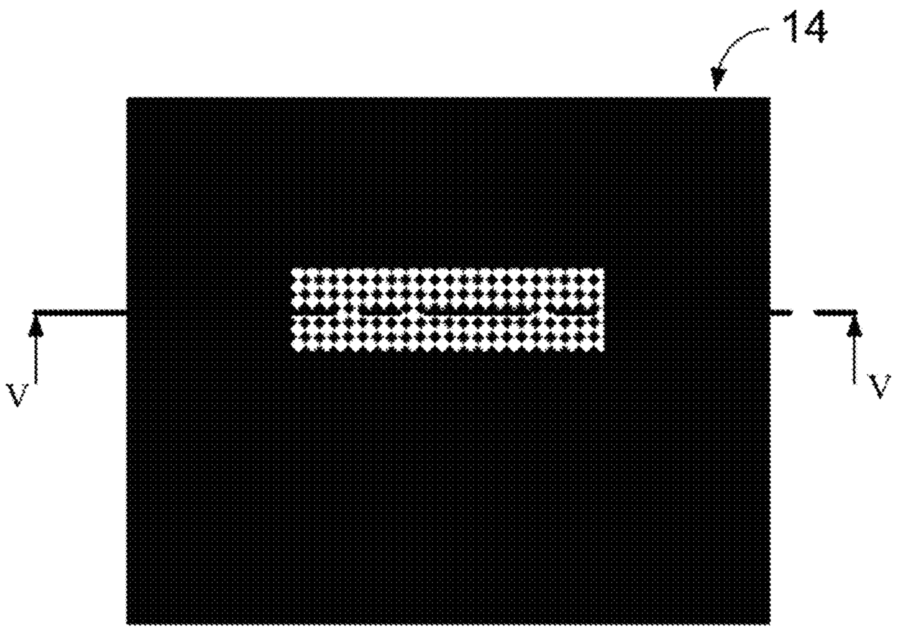
FIG. 4 is a schematic vertical view of a lightproof ink layer printed on the screen printing plate and the base film of FIG. 3.
Figure 5:
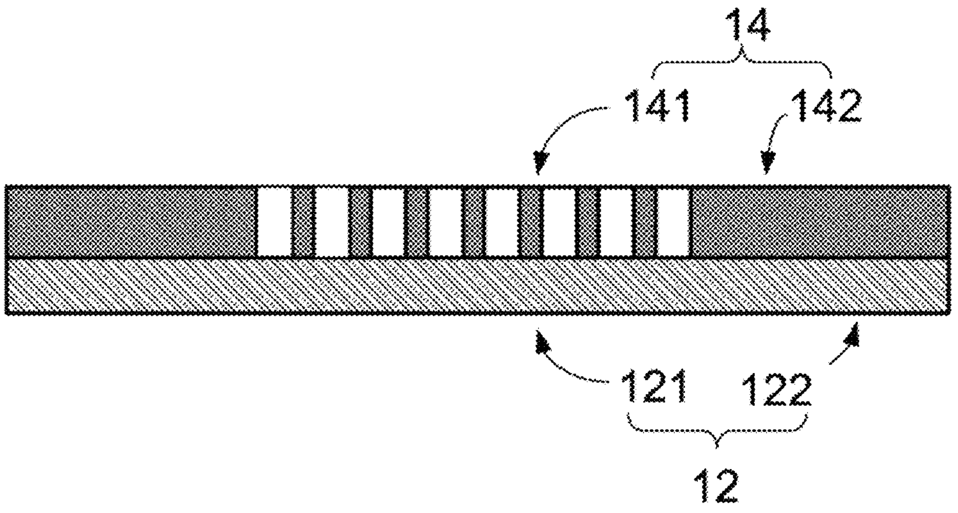
FIG. 5 is a cross sectional view of FIG. 4 along line V-V.

In step S12, lightproof ink material is coated on the second portion 122 and the screen printing plate 13, and then a squeegee blade slides on the lightproof ink material close to the screen printing plate 13, along a direction from the left side of the base film 12 to the right side of the base film 12. As such, referring to FIG. 4 and FIG. 5, a lightproof ink layer 14 is printed on the second portion 122 and on the screen printing plate 13, wherein the lightproof ink layer includes a mesh-like third portion 141 corresponding to the first portion 121 and a fourth portion 142 corresponding to the second portion 122. The pattern of the screen printing plate 13 is transferred to the third portion 141. In other words, the lightproof ink material at the third portion 141 has spotted distribution, meanwhile the lightproof ink material at the fourth portion 142 has continuous distribution. The lightproof ink can be black, red, or other color ink material.

In step S13, the screen printing plate 13 is removed.

Figure 6:
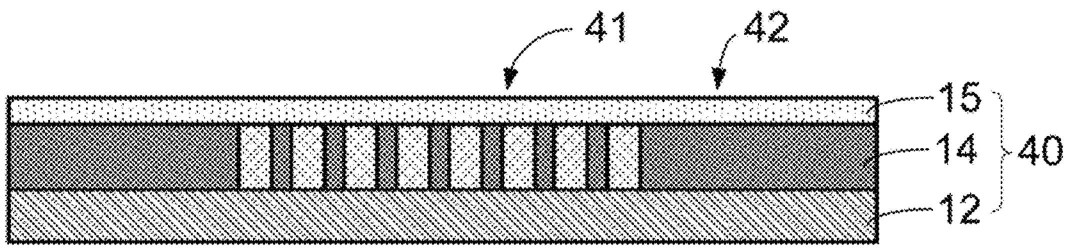
FIG. 6 is a cross sectional view of a light transmitting layer formed on the lightproof ink layer of FIG. 5.

In step S14, referring to FIG. 6, a light transmitting ink layer 15 is coated on the lightproof ink layer 14. The light transmitting ink layer 15 can be transparent or semi-transparent material, such as silver ink. In particular, the light transmitting ink material is filled in the meshes of the third portion 141 and covers the whole lightproof ink layer 14. The base film 12, the lightproof ink layer 14, and the light transmitting layer 15 are deformed to be suitable shape by thermoforming technology to constitute a helmet housing 40. The helmet housing 40 includes a light transmitting portion 41 and a lightproof portion 42. The light transmitting portion 41 corresponds to the first and third portions 121, 141, the lightproof portion 42 corresponds to the second and fourth portions 122, 142.

Figure 7:
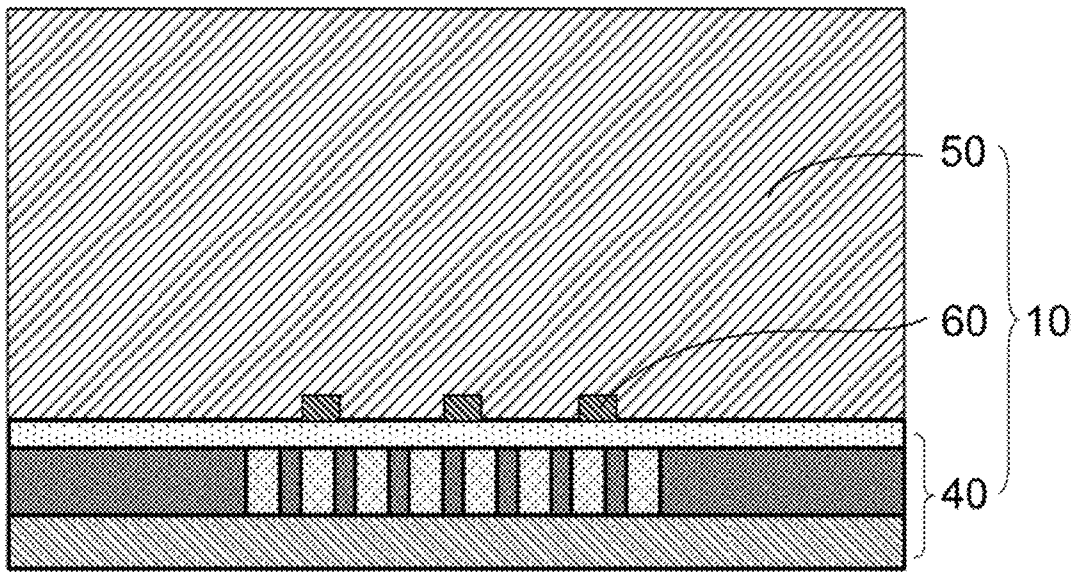
FIG. 7 is a cross sectional view of light sources and helmet base attached on the light transmitting layer of FIG. 6.

In step S15, referring to FIG. 7, at least one light source 60 is attached on the light transmitting ink layer 15 corresponding to the first portion 121 and the third portion 141. The light source 60 can be light emitting diode (LED) or organic light emitting diode (OLED). The number of the at least one light source 60 can be single one, or more than two. For example as shown in FIG. 7, there are three light sources 60 arranged along a line. The spotted distribution ink material cannot block all light emitted from the light sources 60, so that most light emitted from the light sources 60 can exit from the light transmitting portion 41 to the outside.

In step S16, referring to FIG. 7, a helmet base 50 is formed on the light transmitting ink layer 15 and covers the at least one light source 60 by injection molding technology. The helmet base 50, the at least one light source 60, and the helmet housing 40 constitute a helmet 10.

Figure 8:
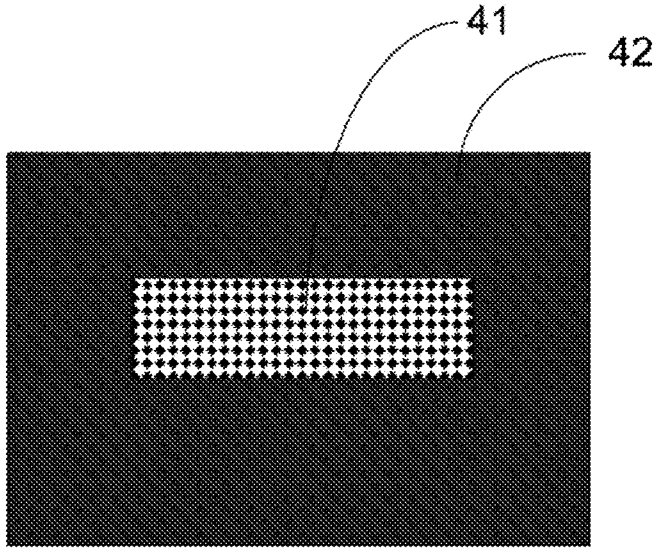
FIG. 8 is a schematic view of the helmet when the light sources are switched on, according to the first embodiment of the present invention.

In other words, the helmet 10 manufactured by above method comprises the helmet base 50, the at least one light source 60, and the helmet housing 40, as shown in FIG. 7. The helmet base 50 can be made of anti-impact material, such as Expanded Polystyrene (EPS). The at least one light source 60 can be light emitting diode (LED) or organic light emitting diode (OLED). The number of the at least one light source 60 can be single one, or more than two. More than two light sources 60 can be arranged along a line. The helmet housing 40 includes the base film 12, the lightproof ink layer 14, and the light transmitting layer 15. The helmet housing 40 has a light transmitting portion 41 and a lightproof portion 42. The light transmitting portion 41 is consisted of the first portion 121, the third portion 141, and portion of the light transmitting layer 15. The lightproof portion 42 is consisted of the second portion 122, the fourth portion 142, and the other portions of the light transmitting layer 15. The at least one light source 60 is mounted in the helmet base 50 and corresponds to the light transmitting portion 41. The spotted distribution ink material cannot block all light emitted from the light sources 60, so that most light emitted from the light sources 60 can exit from the light transmitting portion 41 to the outside when the light sources 60 are turned on, as shown in FIG. 8. Meanwhile, the light sources 60 hidden in the helmet 10 cannot be observed clearly from outside, when the light sources 60 are turned off.

Figure 9:
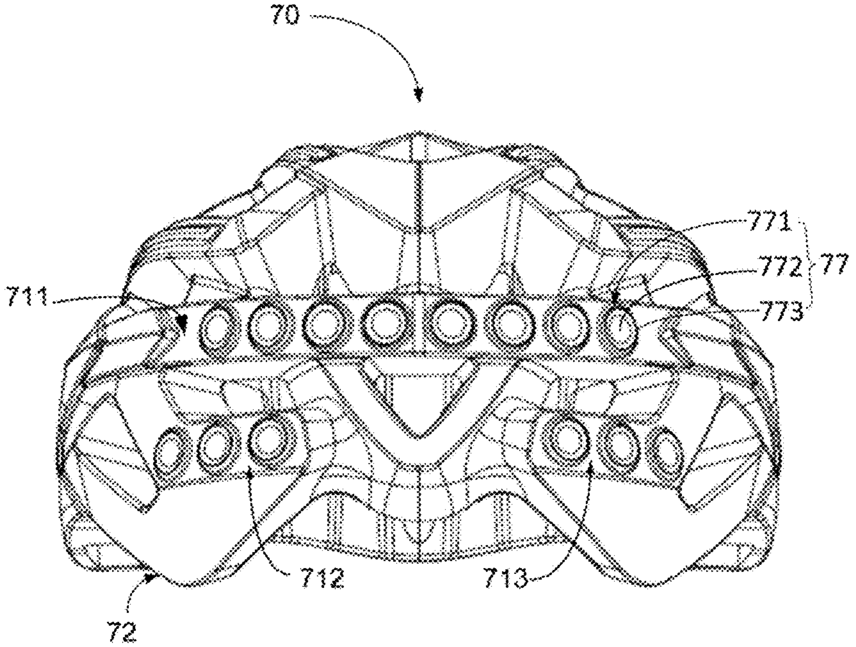
FIG. 9 is a rear view of a helmet, according to the second embodiment of the present invention.
Figure 10:
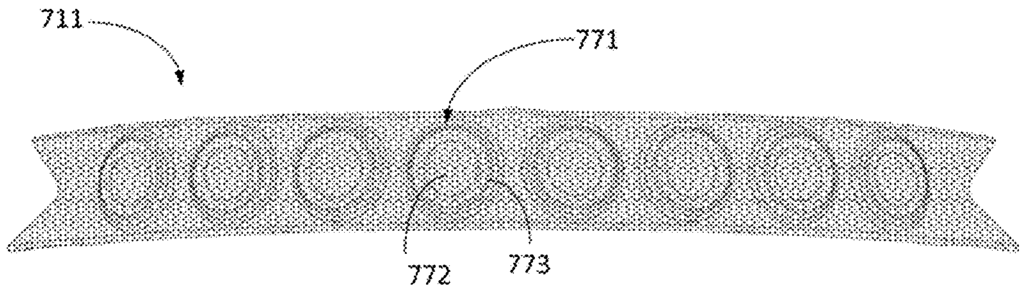
FIG. 10 is a schematic view of a light transmitting portion corresponding to a plurality of diffusion structures of FIG. 9.

In the present embodiment, more than two light sources 60 are arranged along a line corresponding to one light transmitting portion 41. In the second embodiment as shown in FIG. 9, a helmet 70 includes a number of light sources distributed at different locations, a helmet housing 72 including several light transmitting portions 711-713, and a helmet base. In detail, the helmet housing 72 includes an above elongated light transmitting portion 711 and two below symmetrical light transmitting portions 712, 713. The above one light transmitting portion 711 corresponds to eight light sources arranged along a line, the below light transmitting portions 712, 713 each correspond to three light sources arranged along a line. In order to further expand the scope of light emitted from light sources, a number of diffusion structures 77 corresponding to light sources one by one are formed at the base film of the helmet housing 72, as shown in FIG. 9 and FIG. 10. Each diffusion structure 77 can increase a light scope of a corresponding light source. Each diffusion structure 77 includes a protruding portion 771, which defines a convex surface 772 and an annular groove 773 surrounding the convex surface 772. The shape of the diffusion structure 77 is not limited. As the light sources are hidden in the helmet 70, the light sources cannot be seen from outside when the light sources are off. Person having ordinary skill in the art understands that the outer shape of the helmet 10 of the first embodiment is similar to the helmet 70 of FIG. 9, excepting the arrangement of the light transmitting portions 711 to 713.

Figure 11:
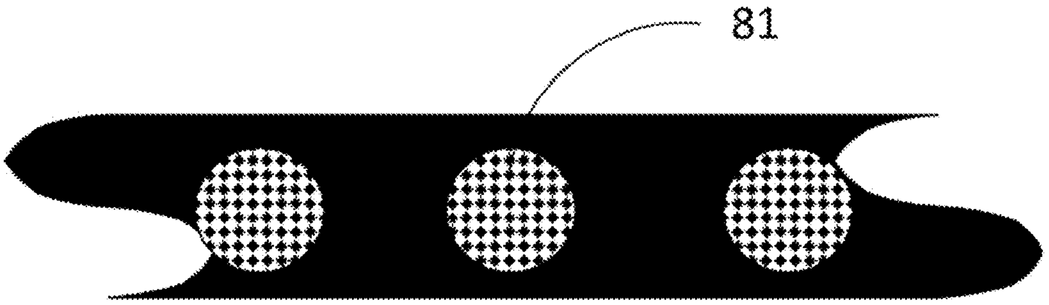
FIG. 11 is a schematic view of a portion of a helmet when light sources are turned on, according to the third embodiment of the present invention.

In the third embodiment, a helmet is similar to the helmet 70 of FIG. 9, except that light sources correspond to light transmitting portions 81 one by one, as shown in FIG. 11. The light transmitting portions 81 correspond to the diffusion structures one by one. Each light transmitting portion 81 has a circular shape. When the light sources are turned on, a number of circular light transmitting portions 81 are lightened.

Above all, light sources are embedded in the helmet of the present invention. The spotted lightproof ink material cannot block all light emitted from the light sources, so that most light emitted from the light sources can exit from the light transmitting portion to the outside. Meanwhile, the light sources hidden in the helmet cannot be observed clearly from outside. In other words, the structure of the helmet cannot be observed clearly.

The contents described above are only preferred embodiments of the present disclosure, but the scope of the present disclosure is not limited to the embodiments. Any ordinarily skilled in the art would make any modifications or replacements to the embodiments in the scope of the present disclosure, and these modifications or replacements should be included in the scope of the present disclosure. Thus, the scope of the present disclosure should be subjected to the claims.

What is claimed is:

1. A method for manufacturing a helmet with a hidden light source, comprising:

providing a transparent base film and a screen printing plate, wherein the base film comprises a first portion and a second portion, and the screen printing plate covers and corresponds to the first portion;

printing a lightproof ink layer on the second portion and the screen printing plate;

removing the screen printing plate;

coating a light transmitting ink layer on the lightproof ink layer;

attaching at least one light source on the light transmitting ink layer corresponding to the first portion; and forming a helmet base to cover the at least one light source.

2. The method for manufacturing a helmet with a hidden light source of claim 1, wherein the step of printing a lightproof ink layer comprises distributing lightproof ink material on the second portion and the screen printing plate and then squeegeeing from one side of the base film to another side of the base film.

3. The method for manufacturing a helmet with a hidden light source of claim 1, wherein the base film, the lightproof ink layer, and the light transmitting layer are deformed to be helmet shaped by thermoforming technology before or after the step of attaching at least one light source.

4. A helmet with a hidden light source, comprising:

a helmet housing comprising a transparent base film, a lightproof ink layer and a light transmitting ink layer in sequence, wherein the base film comprises a first portion and an adjacent second portion, the lightproof ink layer comprises a mesh-like third portion corresponding to the first portion and a fourth portion corresponding to the second portion;

at least one light source attached on the light transmitting ink layer and corresponding to the mesh-like third portion; and a helmet base covering the at least one light source and the light transmitting ink layer.

5. The helmet with a hidden light source of claim 4, wherein the at least one light source comprises a plurality of light sources arranged along a line.

6. The helmet with a hidden light source of claim 5, wherein a plurality of diffusion structures corresponding to light sources one by one are formed at the base film of the helmet housing.

7. The helmet with a hidden light source of claim 6, wherein each diffusion structure includes a protruding portion, which defines a convex surface and an annular groove surrounding the convex surface.

8. A helmet with a hidden light source, comprising:

a helmet housing comprising a transparent base film, a lightproof ink layer and a light transmitting ink layer in sequence, wherein the base film comprises a plurality of first portions and a second portion, the lightproof ink layer comprises a plurality of mesh-like third portions corresponding to the first portions one by one and a fourth portion corresponding to the second portion;

a plurality of light sources attached on the light transmitting ink layer, wherein each third portion corresponds to at least one light source; and a helmet base covering the light sources and the light transmitting ink layer.

9. The helmet with a hidden light source of claim 8, wherein the third portions correspond to the light sources one by one.

10. A helmet with a hidden light source, comprising:

a helmet housing comprising a transparent base film, a lightproof ink layer and a light transmitting ink layer in sequence, wherein the base film comprises a first portions and a second portion, wherein the lightproof ink layer comprises a mesh-like third portion corresponding to the first portion and a fourth portion corresponding to the second portion, wherein the helmet housing has a light transmitting portion and a lightproof portion, the light transmitting portion is consisted of the first portion, the third portion, and portion of the light transmitting layer, and the lightproof portion is consisted of the second portion, the fourth portion, and the other portions of the light transmitting layer;

a plurality of light sources attached on the light transmitting portion; and a helmet base covering the light sources and the light transmitting ink layer.

* * * * *